United States Patent
Au et al.

(10) Patent No.: US 7,865,348 B1
(45) Date of Patent: Jan. 4, 2011

(54) PERFORMANCE OF CIRCUIT SIMULATION WITH MULTIPLE COMBINATIONS OF INPUT STIMULI

(75) Inventors: Wai Chung W. Au, San Jose, CA (US); Alexander I. Korobkov, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 862 days.

(21) Appl. No.: 11/669,458

(22) Filed: Jan. 31, 2007

(51) Int. Cl.
G06F 17/50 (2006.01)

(52) U.S. Cl. .............................. 703/15; 703/13; 703/14; 716/4

(58) Field of Classification Search .................... 703/13, 703/14, 15; 716/4
See application file for complete search history.

(56) References Cited

U.S. PATENT DOCUMENTS

| | | | |
|---|---|---|---|
| 6,807,520 | B1 | 10/2004 | Zhou et al. |
| 6,820,243 | B1 * | 11/2004 | Shey et al. ..................... 716/4 |
| 2004/0015798 | A1 | 1/2004 | Davidson et al. |
| 2004/0153277 | A1 | 8/2004 | Zhang et al. |
| 2006/0111884 | A1 | 5/2006 | McGauhy et al. |

OTHER PUBLICATIONS

Woods et al., "Multiple-Level Logic Simulation Algorithm", IEE Proceedings—Computers and Digital Techniques, May 2001, pp. 129-137.*

Cadence Design Systems, Inc., Using Hierarchy and Isomorphism to Accelerate Circuit Simulation, www.candence.com, 2004, pp. 1-14, San Jose, CA, USA.

Michael M. Green, Enhanced DC Operating Point Analysis Using Probability-One Continuation Methods, Final Report MICRO Project, 2000, pp. 1-4, Univ. Of California, Irvine, CA.

Peter Saviz, Circuit Simulation by Hierarchical Waveform Relaxation, IEEE, Jun. 1993, pp. 845-860. vol. 12 No. 6, USA.

Premal Buch, et. al, Symphony: A Fast Mixed Signal Simulator for BiMOS Analog/Digital Circuits, IEEE, Jan. 1997, pp. 403-407, Berkeley, CA, USA.

Kartikeya Mayaram, et. al., Computer-Aided Circuit Analysis Tools for RFIC Simualtion: Algorithms, Features, and Limitations, IEEE, Apr. 2000, vol. 47 No. 4, USA.

Syed Zakir Hussain, et. al., Automatic Dynamic Mixed-Node Simulation Through Network Reconfiguration, IEEE, 1995, pp. 582-584, Duke University, Durham, North Carolina, USA.

Kai-Ti Huang, et. al., A Novel Graph Algorithm for Circuit Regonition, IEEE, 1999, pp. 1695-1698, Duke University, Durham, NC, USA.

* cited by examiner

Primary Examiner—Kamini S Shah
Assistant Examiner—Herng-Der Day
(74) Attorney, Agent, or Firm—Brooks Kushman P.C.

(57) ABSTRACT

This invention provides techniques and tools for reducing circuit simulation time when an electronic circuit with multiple input vectors is simulated. Instead of running the simulation for each input vector one at a time, the circuit-simulation application runs the simulation of the circuit for all input vectors simultaneously. Efficiencies in the simulation are obtained during each iteration of a transient analysis by grouping circuit instances with different input vectors based on a predetermined criteria, and producing a combined solution for circuit instances within each group.

6 Claims, 7 Drawing Sheets

FIG. 7

PERFORMANCE OF CIRCUIT SIMULATION WITH MULTIPLE COMBINATIONS OF INPUT STIMULI

FIELD OF THE INVENTION

The present disclosure relates generally to simulation of electrical circuits. Particular embodiments disclosed herein allow total simulation runtimes to be reduced.

BACKGROUND OF THE INVENTION

In integrated circuit design verification, electrical circuit simulation is one of the important components utilized by cell characterization, transistor level timing analysis, and other design automation methods and tools. Thus, accurate circuit simulation is a very important step in the design of high performance integrated circuits. A circuit to be simulated is generally described by means of a netlist. A netlist comprises textual data that defines the components used in the circuit and the connections between these components.

In order to reduce the design cycle time, different parts of an original transistor level circuit netlist can being separated and pre-characterized under a variety of input vectors, load conditions, and other factors, to be used later for the entire system analysis. However, as processing technology continues to improve, the size and complexity of electrical circuits continues to increase. This ever increasing size and complexity of integrated circuits requires the use of an inordinate amount of computer time to be spent in circuit simulation. In fact, increasing the number of different input vectors on which a circuit simulation is required to run tends to increase the simulation time exponentially.

SUMMARY OF THE INVENTION

In conventional circuit-simulation applications, it is generally desirable to simulate the circuit for a plurality of input vectors. An input vector comprises a list of values for each input to the simulated circuit. Conventional circuit-simulation applications simulates a circuit using a single input vector at a time. That is, a conventional circuit-simulation application chooses an input vector and runs the circuit simulation using the chosen input vector to completion and reports the results. The conventional circuit-simulation application then chooses another input vector and then again runs the simulation of the circuit to completion before choosing another input vector.

Inventive matter discussed herein deviates with respect to and improves upon conventional simulation technology and other technology also known in the prior art. Disclosed embodiments provide for simulating a circuit for a plurality of input vectors by performing the simulation on the plurality of input vectors simultaneously rather than running the simulation to completion for each input vector before starting the simulation for then next input vector in the plurality of input vectors. Embodiments disclosed herein provide for reduced total runtimes for circuit simulation. Other benefits may become apparent upon reading and understanding embodiments disclosed herein.

Embodiments disclosed herein can take advantage of the fact that two different simulated instances of a particular simulated circuit, or subcircuit, may have the same DC solution or the same transient solution for a period of time, even if the input vectors to the instances are different. In particular embodiments, a circuit-simulation application can create advantages by grouping such cases (i.e., instances of a simulated circuit having the same solution) together and then efficiently simulating the instances within the group. When simulating the group together, a circuit-simulation application still performs a transient analysis for every case within the group. However, in particular embodiments, the circuit-simulation application can perform the simulation of the entire group more efficiently because of the grouping. For example, if a circuit-simulation application is using a partitioning technique, it may be beneficial for the circuit-simulation application to reuse subcircuit solutions corresponding to different cases within a group rather than recalculating the subcircuit solutions.

In a first embodiment, a circuit-simulation application receives a description of an electronic circuit. The circuit-simulation application performs a DC operating point analysis of the electronic circuit for a plurality of input vectors to produce a solution corresponding to each input vector. The circuit-simulation application then iteratively performs a transient analysis phase until a predetermined amount of simulated time has elapsed. In each transient analysis phase, the circuit-simulation application groups the input vectors based on a predetermined criteria applied to the solutions and performs a transient analysis on each group for a predetermined increment of simulated time to update the solution corresponding to each input vector in the group.

In a second embodiment, logic is disclosed that is operable to perform methods and process disclosed herein. In a third embodiment, computer systems are disclosed that are enabled to perform methods and processes disclosed herein. It is to be understood that the inventive matter disclosed herein may be embodied strictly as computer software, as computer software and hardware, or as hardware alone. The features disclosed herein may be employed in workstations and other computerized devices and software systems for such devices such as those manufactured by SUN Microsystems, Inc., of Santa Clara, Calif.

BRIEF DESCRIPTION OF THE DRAWINGS

The above and further objects, features, and advantages of disclosed embodiments may be better understood by referring to the following description of example embodiments in conjunction with the accompanying drawings, in which like reference characters indicate like structural elements and features in the various figures. The drawings are not meant to limit the scope of the invention. For clarity, not every element may be labeled in every figure. The drawings are not necessarily to scale, emphasis instead being placed upon illustrating embodiments, principles, and concepts.

DESCRIPTION OF EXAMPLE EMBODIMENTS

Figure 1:
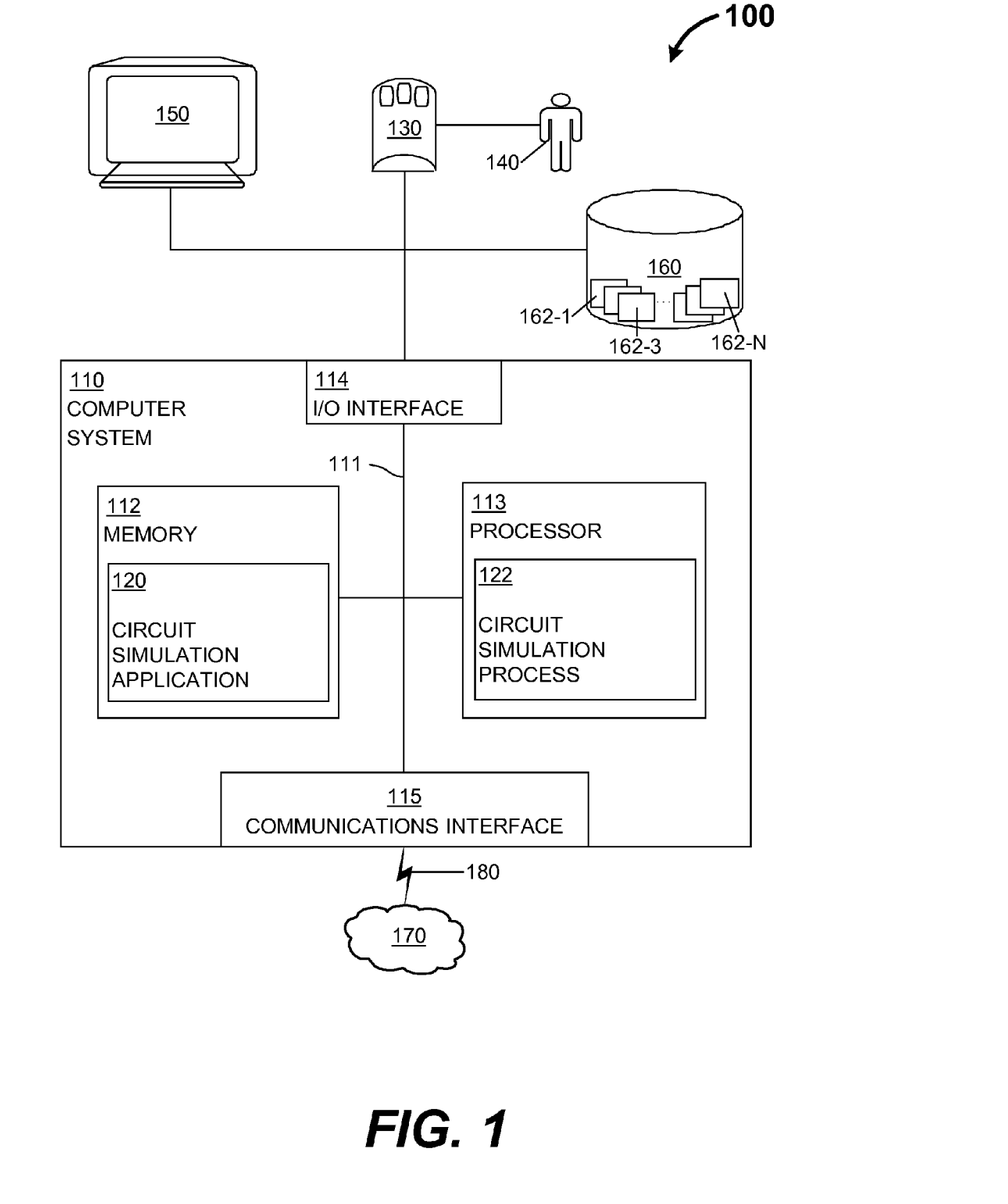
FIG. 1 is a block diagram of a computer environment illustrating an example architecture of a respective computer system useful for implementing a circuit-simulation application according to embodiments disclosed herein.

FIG. 1 is a block diagram of a computer environment 100 illustrating an example architecture of a respective computer system 110 useful for implementing a circuit-simulation application 120 according to embodiments disclosed herein. Computer system 110 can be a computerized device such as a personal computer, workstation, portable computing device, console, network terminal, processing device, etc. As shown, computer system 110 of the present example includes an interconnect 111, such as a data bus or other circuitry, that couples a memory system 112, a processor 113, I/O interface 114, and a communications interface 115. An input device 130 (e.g., one or more user/developer-controlled devices such as a keyboard, mouse, touchpad, trackball, etc.) couples to the processor 113 through the I/O interface 114 and enables a user 140, such as a circuit-simulation user or a circuit-simulation developer, to provide input commands and generally interact with a graphical user interface that the circuit-simulation application 120 and the circuit-simulation process 122 provide on a display 150. I/O interface 114 potentially provides connectivity to peripheral devices such as the input device 130, display screen 150, storage device 160, etc. The computer environment 100 includes a storage device 160 for storing a plurality of files 162. The files 162 may comprise circuit netlists, circuit-simulation results, or partial results of circuit simulations, for example.

Communications interface 115 enables computer system 110 to communicate with network 170 over the communication link 180 to retrieve and transmit information from remotely located sources if necessary. For example, the computer system 110 may be communicatively connected via the communication link 180 to a computer system on the network 170 that may provide a netlist of a circuit to be simulated. Similarly, the computer system 110 may transmit results of a simulation to such a computer system on the network 170.

As shown, memory system 112 can be any type of computer-readable medium and in this example is encoded with circuit-simulation application 120 that supports functionality as herein described. Circuit-simulation application 120 can be embodied as computer software code such as data and/or logic instructions (e.g., code stored in the memory or on another computer-readable medium such as a disk) that supports processing functionality according to different embodiments described herein. During operation of the computer system 110, processor 113 accesses the memory system 112 via the interconnect 111 in order to launch, run, execute, interpret, or otherwise perform the logic instructions of the circuit-simulation application 120. Execution of the circuit-simulation application 120 produces processing functionality in a circuit-simulation process 122. In other words, the circuit-simulation process 122 represents one or more portions of the circuit-simulation application 120 performing within or upon the processor 113 in the computer system 110. Those skilled in the art will understand that the computer system 110 can include other processes and/or software and hardware components, such as an operating system that controls allocation and use of hardware resources.

It should be noted that, in addition to the circuit-simulation process 122 that carries out method operations as discussed herein, other embodiments herein include the circuit-simulation application 120 itself (i.e., the un-executed or non-performing logic instructions and/or data). The circuit-simulation application 120 may be stored on a computer-readable medium such as a floppy disk, hard disk, or in an optical medium. According to other embodiments, the circuit-simulation application 120 can also be stored in a memory type system such as in firmware, read-only memory (ROM), or, as in this example, as executable code within the memory system 112 (e.g., within Random Access Memory or RAM). Thus, it should be understood that embodiments disclosed herein include logic encoded in one or more tangible media for execution and, when executed, operable to perform methods and processes disclosed herein. Such logic may be embodied strictly as computer software, as computer software and hardware, or as hardware alone.

Functionality supported by computer system 110 and, more particularly, functionality associated with circuit-simulation application 120 and circuit-simulation process 122 is herein discussed in relation to FIGS. 2-7. For purposes of the following discussion, computer system 110 (e.g., circuit-simulation application 120 and/or circuit-simulation process 122) generally performs procedures discussed herein in relation to FIGS. 2-7. However, other systems can be configured to provide similar functionality.

Figure 2:
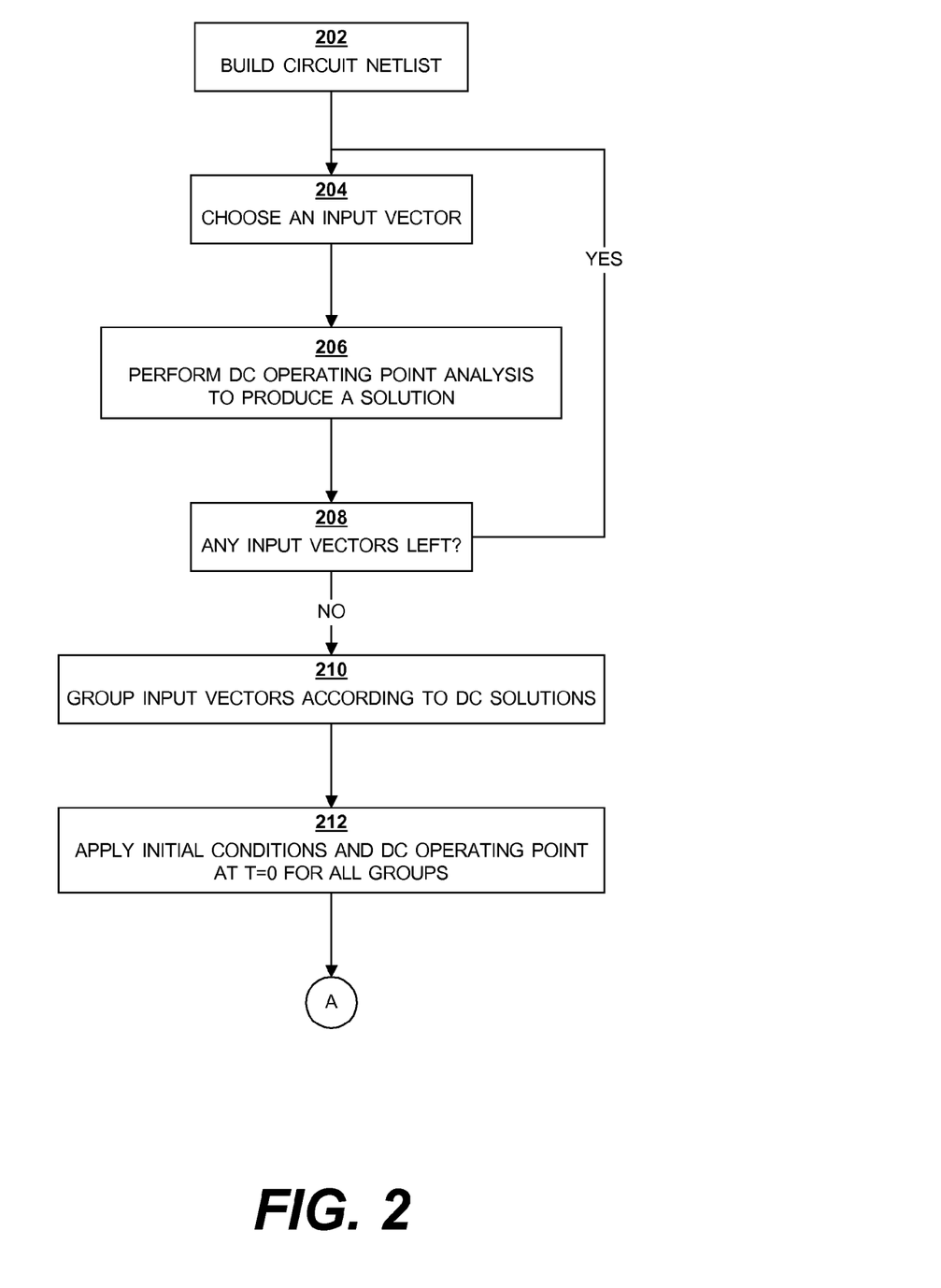
FIG. 2 illustrates a flowchart comprising procedures performable by a circuit-simulation application in accordance with embodiments disclosed herein.

FIG. 2 illustrates a flowchart comprising procedures performable by a circuit-simulation application in accordance with embodiments disclosed herein. The procedures shown in the flowchart of FIG. 2 generally comprise a DC operating point analysis of the simulated circuit for a plurality of vector inputs. In step 202, the circuit-simulation application builds a netlist for an electronic circuit. Netlists, and methods for building them, are generally known in the art of circuit simulation.

In step 204, the circuit-simulation application chooses an input vector. The circuit-simulation application starts with a plurality of input vectors and each time through the loop represented by steps 204, 206, and 208 the circuit-simulation application chooses a different input vector for use in performing a DC operating point analysis on the circuit.

In step 206, the circuit-simulation application performs a DC operating point analysis corresponding to the chosen input vector. Methods for performing a DC operating point analysis are generally known in the art and can be used in embodiments of the circuit-simulation application as disclosed herein. As a result of performing the DC operating point analysis of step 206, the circuit-simulation application produces a solution for the circuit simulation corresponding to the input vector chosen in step 204.

In step 208, the circuit-simulation application determines whether there are still input vectors for which a DC operating point analysis has not been performed. If so, the circuit-simulation application returns to step 204 and chooses another input vector. If not, the circuit-simulation application proceeds to step 210.

At the completion of step 208, the circuit-simulation application has produced a plurality of solutions to the circuit being simulated. Each solution corresponds to a different input vector, but the circuit being simulated to produce each solution is the same circuit.

In step 210, the circuit-simulation application creates groups according to the solutions produced when the circuit-simulation application performed the DC operating point analyses. Input vectors corresponding to similar solutions are placed in the same group (i.e., they are grouped together). The circuit-simulation application uses a predetermined criteria to determine which solutions are sufficiently similar to group the corresponding input vectors. The predetermined criteria may vary from one embodiment to another.

In step 212, the circuit-simulation application applies initial conditions and the DC operating point at t=0 for all groups. The circuit-simulation application performs step 212 in preparation for a transient analysis phase. Such preparation for transient analysis in a circuit simulation is generally known in the art.

Figure 3:
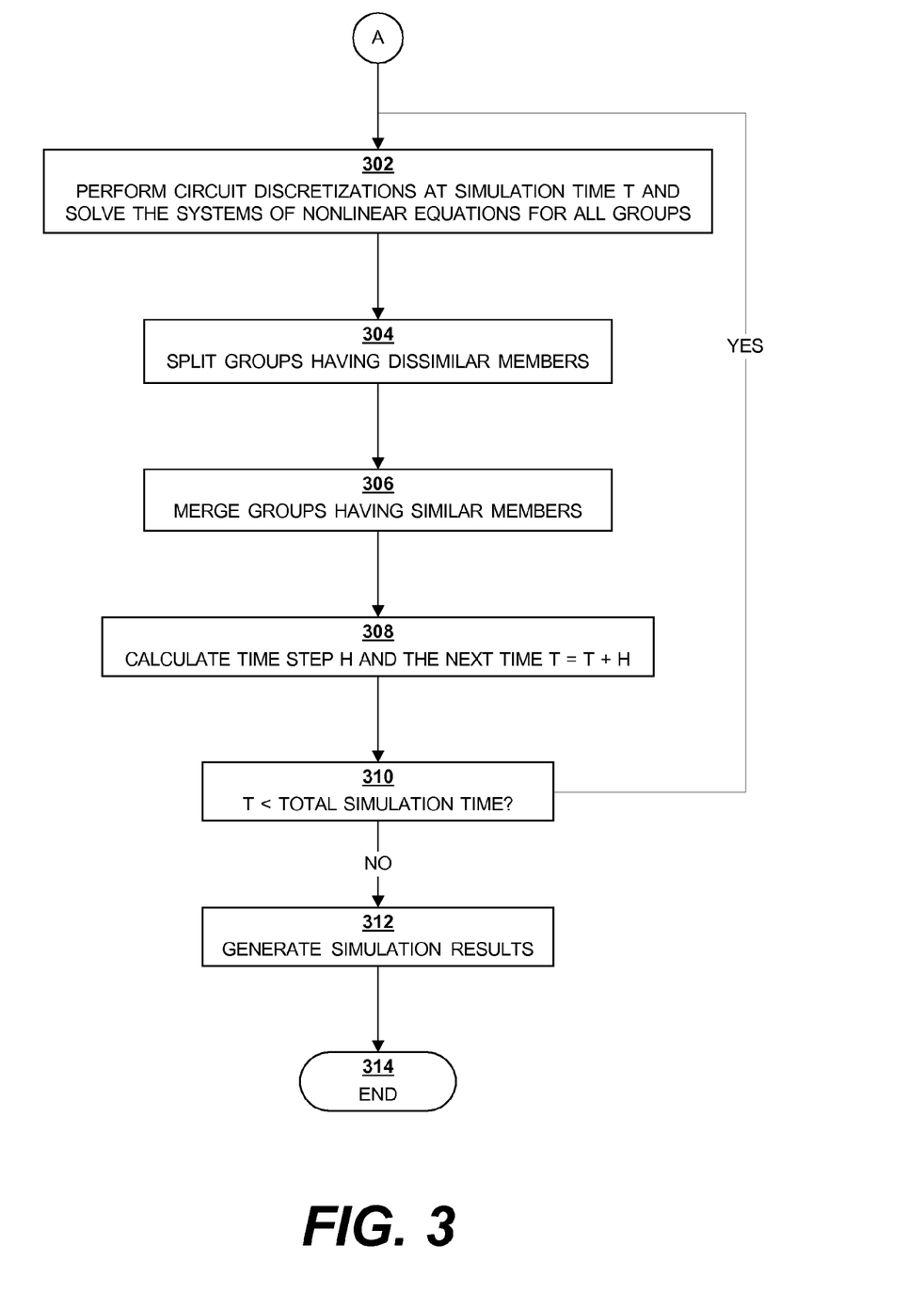
FIG. 3 illustrates a continuation of the flowchart illustrated in FIG. 2, the continuation comprising additional procedures performable by a circuit-simulation application in accordance with embodiments disclosed herein.

FIG. 3 illustrates a continuation of the flowchart illustrated in FIG. 2, the continuation comprising additional procedures performable by a circuit-simulation application in accordance with embodiments disclosed herein. The procedures shown in the flowchart of FIG. 3 generally comprise a transient analysis of the simulated circuit for the plurality of vector inputs.

In step 302, the circuit-simulation application performs circuit discretizations at simulated time t and solves the system of nonlinear equations for all groups. Because the solutions for each member in a group are similar, the circuit-simulation application can solve the system of nonlinear equations for a group more efficiently than if the members of the group where not grouped.

In step 304, the circuit-simulation application splits groups that have dissimilar members. The circuit-simulation application compares the solutions within each group using the predetermined criteria. The purpose of this comparison is to see whether any of the solutions in the group have become sufficiently different after step 302 to warrant their separation from the group. If there are solutions in the group that are not within a predetermined tolerance of similarity, then the circuit-simulation application splits the group into separate groups. The circuit-simulation application performs this comparison of solutions in a group and splitting of the group, if necessary, for all groups. After the circuit-simulation application completes step 304 each group will contain solutions that are all within the predetermined tolerance of similarity.

In step 306, the circuit-simulation application merges groups that have similar members. The circuit-simulation application compares solutions between different groups. If the solutions in two or more groups are all within the predetermined tolerance of similarity, then the circuit-simulation application merges the solutions of the two or more groups into a single group.

In step 308, the circuit-simulation application calculates time step increment h and sets the simulated time t to be equal to t+h. That is, the simulated time t is incremented by the increment amount h. The increment amount h may be calculated in step 308 or, in particular embodiments, the increment amount h may remain constant throughout the circuit simulation.

In step 310, the circuit-simulation application determines if the simulated time t is less than the total simulation time. That is, the circuit-simulation application determines if the circuit needs to be simulated for an additional amount of time. If so, the circuit-simulation application returns to step 302 to continue the simulation. If not, the circuit-simulation application proceeds to step 312.

In step 312, the circuit-simulation application generates simulation results. Methods for generating simulation results are generally known in the art and can be advantageously used with embodiments disclosed herein. In step 314, the circuit-simulation application ends.

Figure 4:
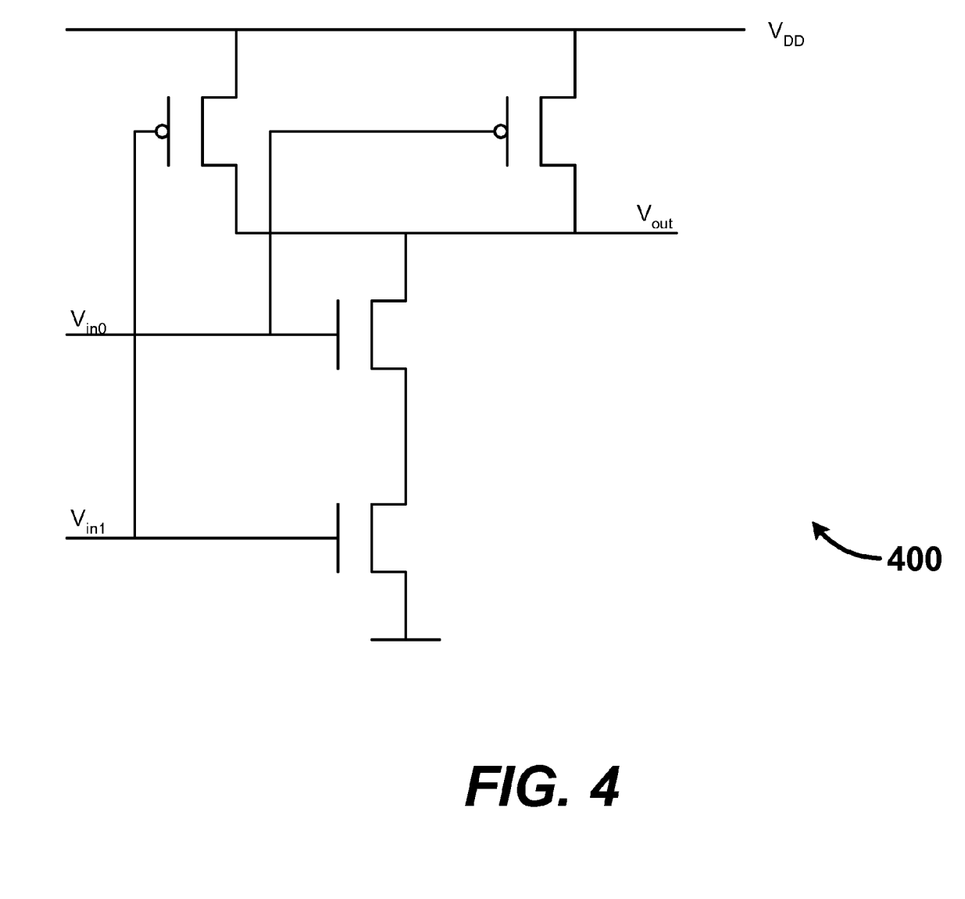
FIG. 4 illustrates a 2-input NAND gate, which can be simulated in accordance with embodiments disclosed herein.

FIG. 4 illustrates a 2-input NAND gate 400, which can be simulated in accordance with embodiments disclosed herein. The NAND gate 400 has two inputs, $V_{in0}$ and $V_{in1}$, and a single output, $V_{out}$. As is generally known in the art, the values of the inputs and output may vary over the simulated time t. Each input vector I has two components that are a function of simulated time t: $V_{in0}(t)$ and $V_{in1}(t)$.

Figure 5:
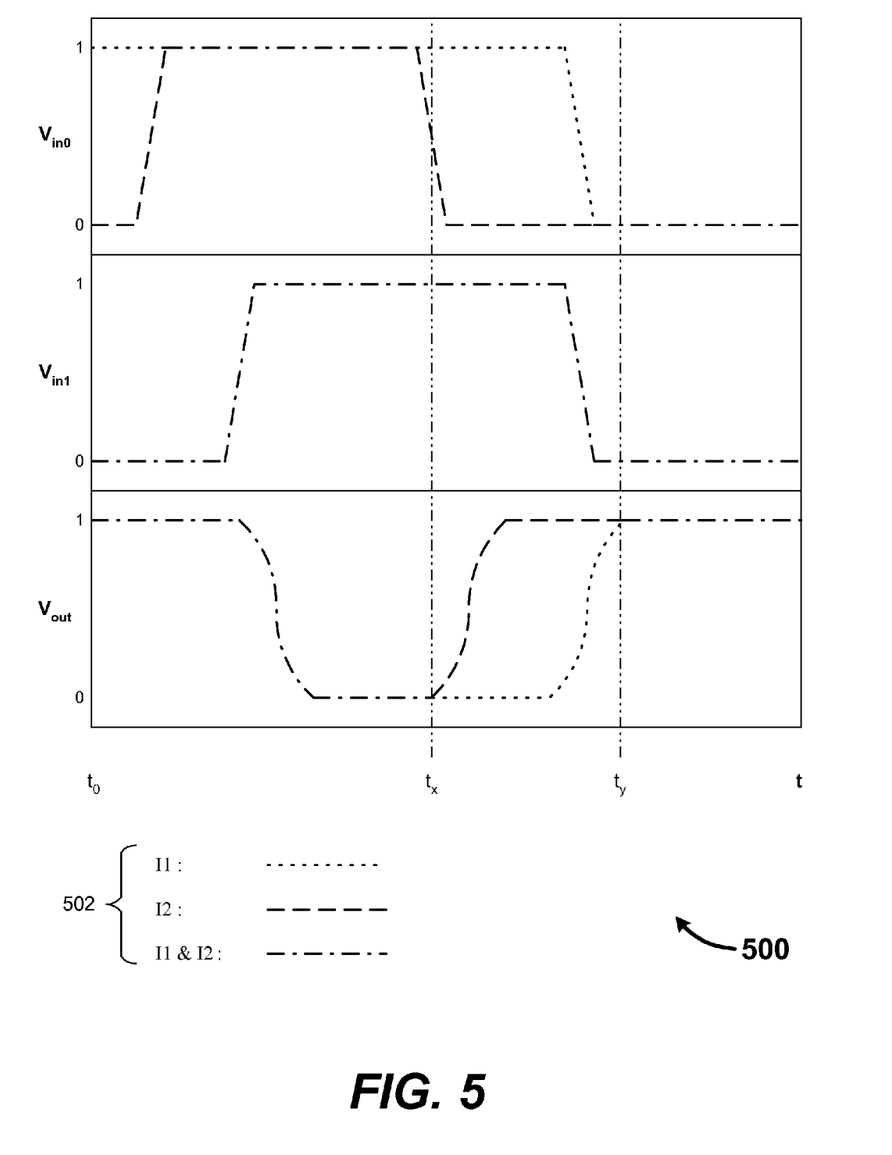
FIG. 5 shows a graph that illustrates 2 input waveforms and an output waveform for the NAND gate illustrated in FIG. 4.

FIG. 5 shows a graph 500 that illustrates two input waveforms and an output waveform for the NAND gate 400 illustrated in FIG. 4. The waveforms showing the value of the inputs corresponding to the input vector I1 and the value of the output generated for input vector I1 are represented by a dotted line as indicated by the legend 502 in FIG. 5. Similarly, the waveforms showing the value of the inputs corresponding to the input vector I2 and the value of the output generated for input vector I2 are represented by a dashed line as indicated by the legend 502 in FIG. 5. The portions of the waveforms where the values shown by the dotted lines and the values shown by the dashed lines overlap are shown by a mixed dotted/dashed line as indicated by the legend 502 in FIG. 5.

During a simulation of NAND gate 400 in accordance with embodiments disclosed herein, both input vector I1 and input vector I2 give the same DC solution at $t_0$ so the circuit-simulation application places these input vectors into the same group. During the transient analysis phase (until $t=t_x$), the circuit-simulation application produces the same value of $V_{out}$ for both I1 and I2 and, therefore, keeps these input vectors grouped together. For each simulated time step until $t=t_x$ during this period of the transient analysis for t=0 to $t=t_x$, circuit instances within the group can be simulated efficiently. For example, one of the circuit instances in the group can be treated as the leader of the group. The circuit-simulation application can produce the solution for the leader using conventional methods. The circuit-simulation application may perform conventional time integration methods and may perform conventional Newton-Raphson methods to produce a solution.

After the circuit-simulation application produces a solution for the leader circuit instance, the circuit-simulation application may use more computationally efficient methods to produce solutions for the other instances in the group. In particular embodiments for example, after the circuit-simulation application produces a solution for the leading instance at a given simulated time step, the circuit-simulation application may back substitute to the case for another instance to evaluate the residue of the solution. If the residue is less than a predetermined criteria, the circuit-simulation application may accept the solution as that of the other instance. It is more computationally efficient for the circuit-simulation application to produce the solution for other instances in this manner than to use the conventional methods used to produce the solution for the leader instance. In other particular embodiments, the circuit-simulation application, in producing the solution for the other instance, may be able to reuse the results of calculations performed in producing the solution for the leading instance without having to perform the calculations again.

At $t=t_x$, the circuit-simulation application determines that the solution for the leading instance (i.e., the instance corresponding to I1) is no longer sufficiently similar to the solution for the other instance (i.e., the instance corresponding to I2). At this point, the circuit-simulation application performs a group splitting operation. As the simulation continues from the point of the splitting operation, the input vectors are in separate groups and since each input vector is the only input vector in its group in this simplified example, the circuit-simulation application treats each input vector as the leader of its group. Thus, for each simulated time step during this period, the circuit-simulation application may perform the same conventional time integration methods and may perform the same conventional Newton-Raphson methods to solve the non-linear set of equations arising from non-linear circuit devices for each input vector.

At $t=t_y$, the circuit-simulation application determines that the solution for the instance corresponding to I1 is again sufficiently similar to the solution for the instance corresponding to I2 to place the two input vectors in the same group. That is, at this point the circuit-simulation application merges the two groups into a single group containing both I1 and I2.

Figure 6:
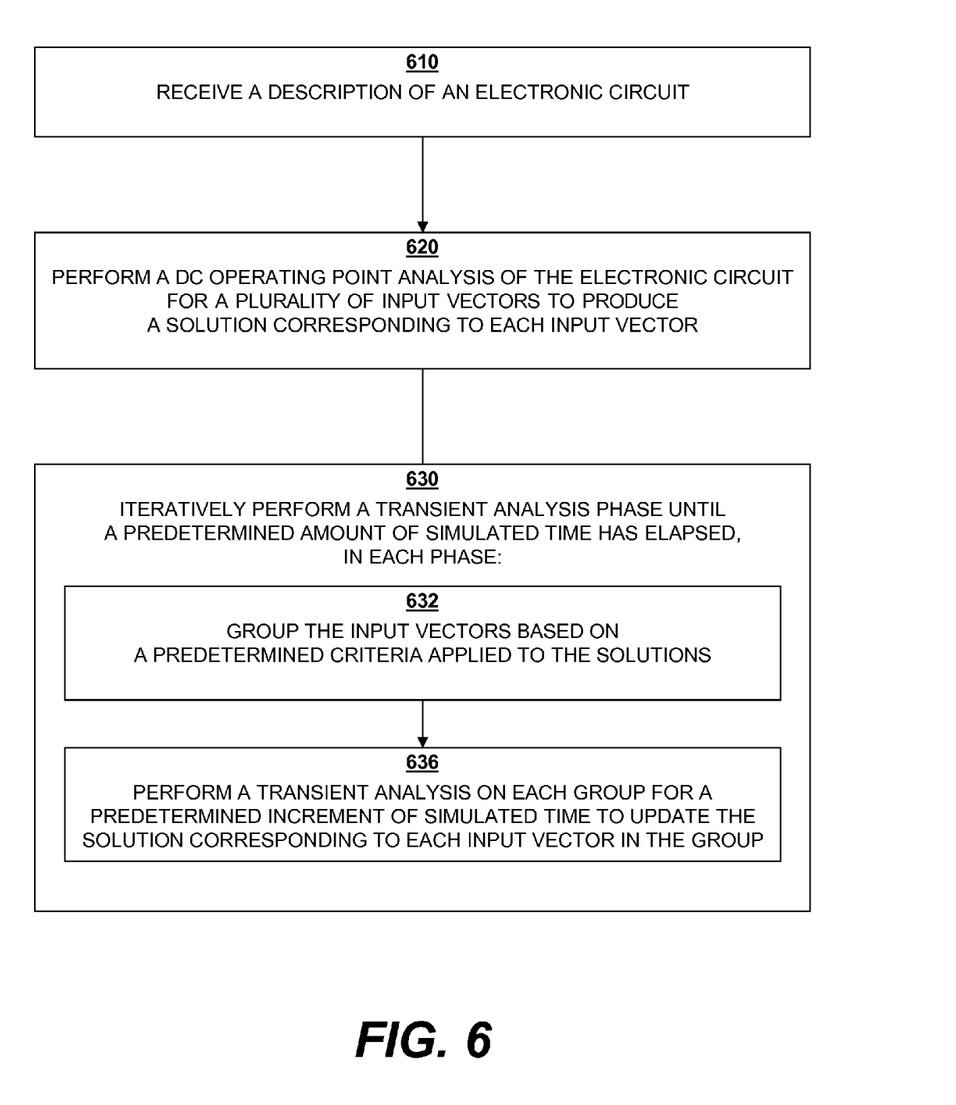
FIG. 6 illustrates procedures performable by a circuit-simulation application in accordance with embodiments disclosed herein.

FIG. 6 illustrates procedures performable by a circuit-simulation application in accordance with embodiments disclosed herein. In step 610, the circuit-simulation application receives a description of an electronic circuit. Formats for electronic-circuit descriptions (e.g., netlists) are generally known in the art and, in particular embodiments, the circuit-simulation application may receive an electronic-circuit description in such a known format.

In step 620, the circuit-simulation application performs a DC operating point analysis of the electronic circuit for a plurality of input vectors to produce a solution corresponding to each input vector. The circuit-simulation application may use techniques known in the art for performing the DC operating point analyses.

In step 630, the circuit-simulation application iteratively performs a transient analysis phase until a predetermined amount of simulated time has elapsed. Step 630 comprises steps 632 and 636.

In step 632, the circuit-simulation application groups the input vectors based on a predetermined criteria applied to the solutions. That is, input vectors corresponding to solutions that are sufficiently similar according to the application of the predetermined criteria are grouped together. The predetermined criteria may vary from one embodiment to another. In particular embodiments, the circuit-simulation application uses predetermined criteria designed to group input vectors having similar solutions so that computational efficiencies can be gained when a transient analysis is performed on the group.

In step 636, the circuit-simulation application performs a transient analysis on each group for a predetermined increment of simulated time to update the solution corresponding to each input vector in the group. Because all input vectors in a group correspond to a similar solution, the circuit-simulation application may be able to reuse calculations instead of recalculating for each input vector in the group.

Figure 7:
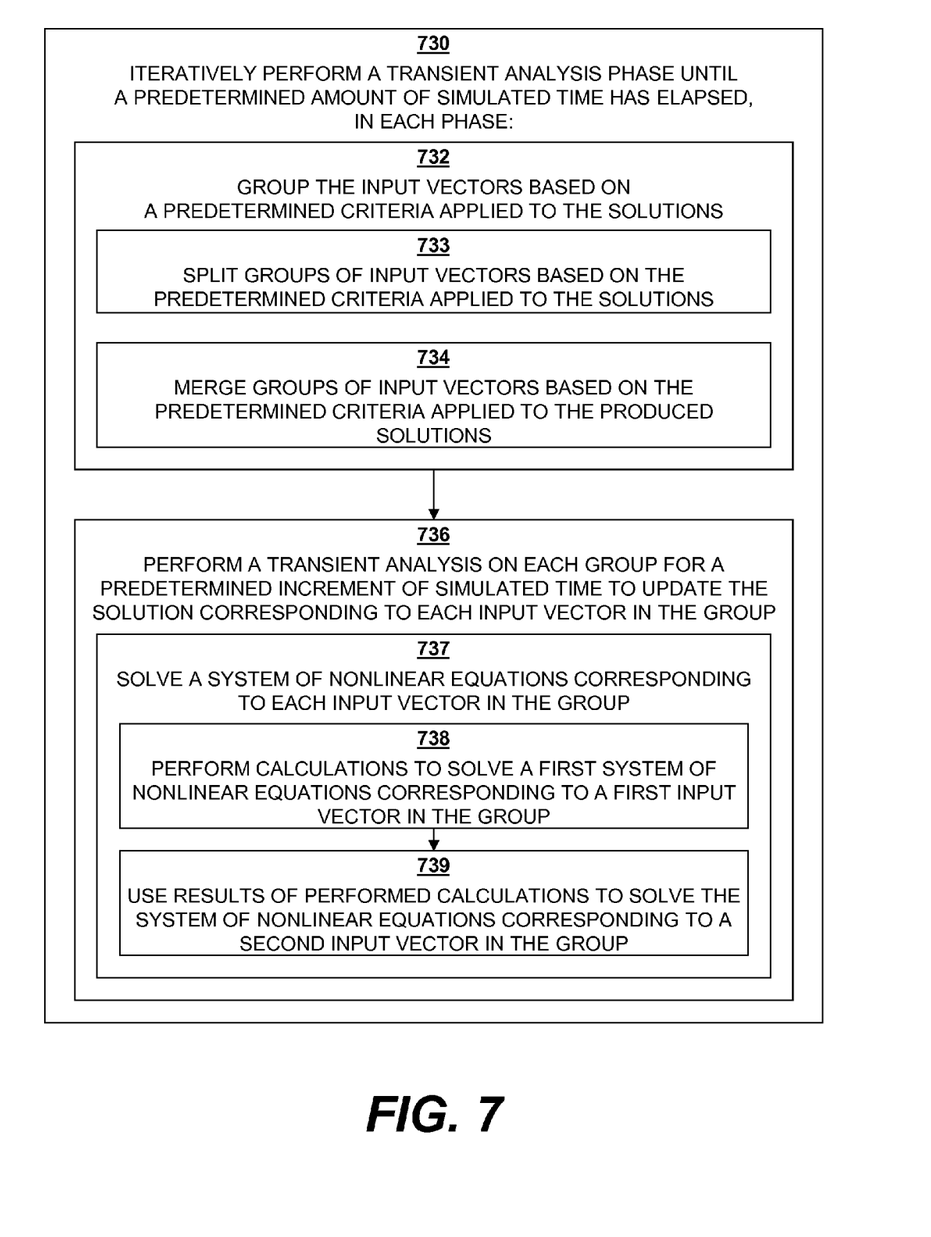
FIG. 7 illustrates additional procedures performable by a circuit-simulation application in accordance with embodiments disclosed herein.

FIG. 7 illustrates additional procedures performable by a circuit-simulation application in accordance with embodiments disclosed herein. In particular embodiments, the circuit-simulation application may perform step 730 in place of step 630 of FIG. 6. In step 730, the circuit-simulation application iteratively performs a transient analysis phase until a predetermined amount of simulated time has elapsed. Step 730 comprises steps 732 and 736.

In step 732, the circuit-simulation application groups the input vectors based on a predetermined criteria applied to the solutions. Step 732 comprises steps 733 and 734.

In step 733, the circuit-simulation application splits groups of input vectors based on the predetermined criteria applied to the solutions. In step 734, the circuit-simulation application merges groups of input vectors based on the predetermined criteria applied to the produced solutions. In particular embodiments, steps 733 and 734 may be intertwined. For example, the circuit-simulation application may split a group into two new groups because solutions in the group may not be sufficiently similar to remain in the group and may merge the two new groups with other groups before determining whether other groups also need to be split. In other embodiments, the circuit-simulation application may complete step 733 by determining for each group whether a split is warranted before determining whether merging any groups is warranted.

In step 736, the circuit-simulation application performs a transient analysis on each group for a predetermined increment of simulated time to update the solution corresponding to each input vector in the group. Step 736, comprises step 737, which in turn comprises steps 738 and 739.

In step 737, the circuit-simulation application solves a system of nonlinear equations to produce a solution corresponding to each input vector in the group. In step 738, the circuit-simulation application performs calculations to solve a first system of nonlinear equations corresponding to a first input vector in the group. In particular embodiments, step 738 may be performed in the exact manner as used in conventional circuit-simulation applications. That is, the circuit-simulation application may perform a transient analysis corresponding to a single input vector for a predetermined increment of simulated time by using conventional techniques to solve a system of nonlinear equations to produce a solution corresponding to the single input vector. The conventional techniques typically involve calculations, the results of which can be reused in solving the system of nonlinear equations to produce a solution corresponding to other single input vectors in the group. In step 739, the circuit-simulation application uses results of performed calculations to solve the system of nonlinear equations corresponding to a second input vector in the group.

In accordance with embodiments described herein, total simulation runtimes for circuit simulations can be reduced. While inventive matter has been shown and described herein with reference to specific embodiments thereof, it should be understood by those skilled in the art that variations, alterations, changes in form and detail, and equivalents may be made or conceived of without departing from the spirit and scope of the inventive matter. The foregoing description of the inventive matter is not intended to be limiting. Rather, the scope of the inventive matter should be assessed as that of the appended claims and by equivalents thereof.

What is claimed is:

1. A method comprising:
   receiving a description of an electronic circuit;
   performing a DC operating point analysis of the electronic circuit for a plurality of input vectors to produce a solution corresponding to each input vector; and
   iteratively performing a plurality of transient analysis phases until a predetermined amount of simulated time has elapsed, each phase comprising:
   grouping the input vectors into a plurality of groups based on a predetermined criteria applied to the solutions; and
   performing a transient analysis on each group for a predetermined increment of simulated time to update the solution corresponding to each input vector in the group;
   wherein grouping the input vectors comprises:
   splitting each group of input vectors having dissimilar members into separate groups based on the predetermined criteria applied to the solutions;
   merging separate groups of input vectors having similar members into a single group based on the predetermined criteria applied to the solutions; and
   wherein performing a transient analysis on a group comprises:
   performing calculations to solve a system of nonlinear equations corresponding to a first input vector in the group; and using results of performed calculations to solve the system of nonlinear equations corresponding to a second input vector in the group.

2. The method of claim 1, wherein performing a transient analysis on a group comprises:
   solving a system of nonlinear equations corresponding to each input vector in the group.

3. A non-transitory computer readable medium having computer readable instructions recorded thereon, the instructions for execution by a computer to perform operations of:
   receiving a description of an electronic circuit;
   performing a DC operating point analysis of the electronic circuit for a plurality of input vectors to produce a solution corresponding to each input vector; and
   iteratively performing a plurality of transient analysis phases until a predetermined amount of simulated time has elapsed, each phase comprising:
      grouping the input vectors into a plurality of groups based on a predetermined criteria applied to the solutions; and
      performing a transient analysis on each group for a predetermined increment of simulated time to update the solution corresponding to each input vector in the group; wherein grouping the input vectors comprises:
         splitting each group of input vectors having dissimilar members into separate groups based on the predetermined criteria applied to the solutions;
         merging separate groups of input vectors having similar members into a single group based on the predetermined criteria applied to the solutions; and
      wherein performing a transient analysis on a group comprises:
         performing calculations to solve a system of nonlinear equations corresponding to a first input vector in the group; and
         using results of performed calculations to solve the system of nonlinear equations corresponding to a second input vector in the group.

4. The computer readable medium of claim 3, wherein the instructions to perform the operation of performing a transient analysis on a group comprises instructions for performing an operation of:
   solving a system of nonlinear equations corresponding to each input vector in the group.

5. A computer system comprising:
   a processor;
   a memory unit that stores instructions associated with an application executed by the processor; and
   an interconnect coupling the processor and the memory unit, enabling the computer system to execute the application and perform operations of:
   receiving a description of an electronic circuit;
   performing a DC operating point analysis of the electronic circuit for a plurality of input vectors to produce a solution corresponding to each input vector; and
   iteratively performing a plurality of transient analysis phases until a predetermined amount of simulated time has elapsed, each phase comprising:
      grouping the input vectors into a plurality of groups based on a predetermined criteria applied to the solutions; and
      performing a transient analysis on each group for a predetermined increment of simulated time to update the solution corresponding to each input vector in the group;
   wherein grouping the input vectors comprises:
      splitting each group of input vectors having dissimilar members into separate groups based on the predetermined criteria applied to the solutions;
      merging separate groups of input vectors having similar members into a single group based on the predetermined criteria applied to the solutions; and
   wherein performing a transient analysis on a group comprises:
      performing calculations to solve a system of nonlinear equations corresponding to a first input vector in the group; and
      using results of performed calculations to solve the system of nonlinear equations corresponding to a second input vector in the group.

6. The computer system of claim 5, wherein the computer system is enabled to execute the application and perform operations wherein performing a transient analysis on a group comprises:
   solving a system of nonlinear equations corresponding to each input vector in the group.

* * * * *